(12) United States Patent
Yin

(10) Patent No.: US 12,081,690 B2
(45) Date of Patent: Sep. 3, 2024

(54) DISPLAY PANEL AND MOBILE TERMINAL

(71) Applicant: WUHAN CHINA STAR OPTOELECTRONICS SEMICONDUCTOR DISPLAY TECHNOLOGY CO., LTD., Wuhan (CN)

(72) Inventor: Bingkun Yin, Wuhan (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 17/442,067

(22) PCT Filed: Jul. 26, 2021

(86) PCT No.: PCT/CN2021/108434
§ 371 (c)(1),
(2) Date: Sep. 22, 2021

(87) PCT Pub. No.: WO2023/272839
PCT Pub. Date: Jan. 5, 2023

(65) Prior Publication Data
US 2024/0031463 A1    Jan. 25, 2024

(30) Foreign Application Priority Data
Jun. 30, 2021    (CN) .......................... 202110732129.1

(51) Int. Cl.
*G06F 1/16*    (2006.01)
*H04M 1/02*    (2006.01)

(52) U.S. Cl.
CPC ................ *H04M 1/0268* (2013.01)

(58) Field of Classification Search
CPC ........................ G06F 1/1652; H04M 1/0268
See application file for complete search history.

(56) References Cited

U.S. PATENT DOCUMENTS

2019/0179466 A1    6/2019  Kim et al.
2019/0369784 A1    12/2019 Yao et al.
(Continued)

FOREIGN PATENT DOCUMENTS

CN    109270759 A    1/2019
CN    111244133 A    6/2020
(Continued)

OTHER PUBLICATIONS

International Search Report in International application No. PCT/CN2021/108434, mailed on Feb. 25, 2022.
(Continued)

*Primary Examiner* — Anthony Q Edwards
(74) *Attorney, Agent, or Firm* — PV IP PC; Wei Te Chung

(57) ABSTRACT

A display panel and a mobile terminal are provided. The display panel has an effective display area and a non-effective display area disposed in sequence. The non-effective display area has a transition area. Two adjacent first island-shaped structures in the effective display area are connected by bridge-shaped structures. The first island-shaped structures and the binding member in the non-effective display area are connected by the bridge-shaped structures in the transition area, and in a direction from the effective display area to the non-effective display area, a width value of the bridge-shaped structures in the transition area gradually increases.

19 Claims, 5 Drawing Sheets

(56) References Cited

U.S. PATENT DOCUMENTS

2020/0168824 A1* 5/2020 Park .................... H10K 77/111
2023/0109049 A1* 4/2023 Wang ................... G06F 1/1652
                                                             361/807

FOREIGN PATENT DOCUMENTS

| CN | 112002234 A | 11/2020 |
| CN | 112258994 A | 1/2021 |
| CN | 112863339 A | 5/2021 |
| CN | 112863341 A | 5/2021 |
| CN | 112863342 A | 5/2021 |

OTHER PUBLICATIONS

Written Opinion of the International Searching Authority in International application No. PCT/CN2021/108434, mailed on Feb. 25, 2022.
Chinese Office Action in corresponding Chinese Patent Application No. 202110732129.1 dated Jan. 27, 2022, pp. 1-7.

* cited by examiner

DISPLAY PANEL AND MOBILE TERMINAL

RELATED APPLICATIONS

This application is a Notional Phase of PCT Patent Application No. PCT/CN2021/108434 having international filing date of Jul. 26, 2021, which claims the benefit of priority of Chinese Patent Application No. 202110732129.1 filed on Jun. 30, 2021. The contents of the above applications are all incorporated by reference as if fully set forth herein in their entirety.

FIELD OF DISCLOSURE

The present disclosure relates to displays, and more particularly to a display panel and a mobile terminal.

BACKGROUND OF DISCLOSURE

At present, with the development of Internet of Things technology, people's requirements for electronic products are getting higher and higher. They are not limited to electronic products with two dimensional (2D) display functions, but also hope that electronic products have three dimensional (3D) free-form surface display technology. Stretchable display technology includes the flexible design of the display backplane, which in turn changes the mechanical properties of the material itself. Therefore, the display panel can be stretched and deformed in any direction on the basis of the original area, so as to realize a stretchable and expandable display. In this way, the stretchable display technology has broad application prospects in the fields of wearable, flexible medical equipment, and vehicle display technology.

In the actual production process, the stretchable display screen suddenly changes due to the design structure at the junction of the effective display area and the non-effective display area. As a result, it is easy to cause stress concentration at the junction of the effective display area and the non-effective display area when it is stretched, causing a disconnection problem in the display panel, which affects the display effect and service life.

SUMMARY OF DISCLOSURE

The present application provides a display panel and a mobile terminal to improve an existing stretchable display screen due to a sudden change in the design structure at a junction of an effective display area and a non-effective display area. As a result, it is easy to cause stress concentration at the junction of the working area and the frame area when it is stretched, causing a disconnection in the display panel, which affects the display effect and the service life of the technical problem.

In order to solve above problems, the technical solutions provided by this application are as follows:

The present application provides a display panel, comprising an effective display area and a non-effective display area, wherein the non-effective display area includes a transition area adjacent to the effective display area, wherein the display panel further comprises:
  a plurality of first island-shaped structures arranged in the effective display area at intervals, wherein each of the first island-shaped structures is provided with at least one pixel unit;
  a binding member arranged in the non-effective display area; and
  a plurality of bridge-shaped structures arranged in the transition area and the effective display area, wherein two adjacent first island-shaped structures in the effective display area are connected by the bridge-shaped structures located in the effective display area, and the first island-shaped structures and the binding member are connected by the bridge-shaped structures located in the transition area,
  wherein the plurality of bridge-shaped structures located in the transition area comprise a plurality of bridge-shaped structure groups, wherein the plurality of the bridge-shaped structure groups are arranged around the effective display area in turn, wherein in any two adjacent bridge-shaped structure groups, a distance between any one of the bridge-shaped structures in the bridge-shaped structure groups that is away from the effective display area and the effective display area is greater than a distance between any one of the bridge-shaped structures in the bridge-shaped structure groups close to the effective display area and the effective display area; and
  wherein in the plurality of bridge-shaped structure groups, one of the bridge-shaped structures in the bridge-shaped structure groups that is away from the effective display area has a width value greater than a width value of the bridge-shaped structures in the bridge-shaped structure groups close to the effective display area, wherein an orthographic projection of the bridge-shaped structures in a direction perpendicular to the display panel comprises a first side and a second side opposite to each other, and a width of the bridge-shaped structures is a distance between the first side and the second side of the orthographic projection corresponding to the bridge-shaped structures.

In an embodiment, in the plurality of bridge-shaped structure groups, a width value of any one of the bridge-shaped structures in the bridge-shaped structure groups adjacent to the effective display area is greater than or equal to a width value of the bridge-shaped structures in the effective display area.

In an embodiment, the bridge-shaped structure groups include at least one sub-bridge-shaped structure group arranged around the effective display area, the sub-bridge-shaped structure group comprises at least two bridge-shaped structures arranged in the transition area, and width values of the bridge-shaped structures in the sub-bridge-shaped structure group are equal.

In an embodiment, the bridge-shaped structure group comprises at least two sub-bridge-shaped structure groups arranged sequentially around the effective display area, wherein in two adjacent sub-bridge-shaped structure groups, a width value of the bridge-shaped structure in one of the sub-bridge-shaped structure groups is equal to a width value of the bridge-shaped structure in another of the sub-bridge-shaped structure groups.

In an embodiment, a plurality of second island-shaped structures are arranged at intervals in the transition area, any two adjacent second island-shaped structures are connected by the bridge-shaped structure, the first island-shaped structures and the second island-shaped structures are adjacent to each other and connected by the bridge-shaped structures, and the second island-shaped structures and the binding member are connected by the bridge-shaped structures in the transition area.

In an embodiment, the transition area comprises a plurality of transition sub-areas, and the plurality of transition sub-areas sequentially surround the effective display area, and at least two of the second island-shaped structures are provided in each of the transition sub-areas, wherein in any two adjacent transition sub-areas, an arrangement density of the second island-shaped structures in the transition sub-areas close to the effective display area is greater than another arrangement density of the second island-shaped structures in the transition sub-areas away from the effective display area.

In an embodiment, in any two adjacent transition sub-areas, an area of the second island-shaped structures in the transition sub-area close to the effective display area is smaller than another area of the second island-shaped structures in the transition sub-area away from the effective display area.

In an embodiment, distances between any two adjacent second island-shaped structures in one transition sub-area are equal to each other.

In an embodiment, the non-effective display area comprises a frame area, and the transition area is located in the frame area and adjacent to the effective display area.

In an embodiment, a plurality of third island-shaped structures are arranged at intervals in the transition area, any two adjacent third island-shaped structures are connected by the bridge-shaped structures, the first island-shaped structures and the third island-shaped structures are adjacent to each other and connected by the bridge-shaped structures, and the third island-shaped structures and the binding member are connected by the bridge-shaped structures in the transition area.

In an embodiment, two adjacent bridge-shaped structures in the transition area are connected to each other, wherein in the plurality of bridge-shaped structure groups, at least one bridge-shaped structure in the bridge-shaped structure groups adjacent to the effective display area is connected to the first island-shaped structures or the bridge-shaped structures located in the effective display area.

The present application further provides a mobile terminal, comprising a display panel and a terminal body, wherein the terminal body and the display panel are combined into one body, the display panel comprises an effective display area and a non-effective display area, and the non-effective display area comprises a transition area adjacent to the effective display area, wherein the display panel further comprises:
a plurality of first island-shaped structures arranged in the effective display area at intervals, wherein each of the first island-shaped structures is provided with at least one pixel unit;
a binding member arranged in the non-effective display area; and
a plurality of bridge-shaped structures arranged in the transition area and the effective display area, wherein two adjacent first island-shaped structures in the effective display area are connected by the bridge-shaped structures located in the effective display area, and the first island-shaped structures and the binding member are connected by the bridge-shaped structures located in the transition area,
wherein the plurality of bridge-shaped structures located in the transition area comprise a plurality of bridge-shaped structure groups, wherein the plurality of the bridge-shaped structure groups are arranged around the effective display area in turn, wherein in any two adjacent bridge-shaped structure groups, a distance between any one of the bridge-shaped structures in the bridge-shaped structure groups that is away from the effective display area and the effective display area is greater than a distance between any one of the bridge-shaped structures in the bridge-shaped structure groups close to the effective display area and the effective display area; and
wherein in the plurality of bridge-shaped structure groups, one of the bridge-shaped structures in the bridge-shaped structure groups that is away from the effective display area has a width value greater than a width value of the bridge-shaped structures in the bridge-shaped structure groups close to the effective display area, wherein an orthographic projection of the bridge-shaped structures in a direction perpendicular to the display panel comprises a first side and a second side opposite to each other, and a width value of the bridge-shaped structures is a distance between the first side and the second side of the orthographic projection corresponding to the bridge-shaped structures.

In an embodiment, in the plurality of bridge-shaped structure groups, a width value of any one of the bridge-shaped structures in the bridge-shaped structure groups adjacent to the effective display area is greater than or equal to a width value of the bridge-shaped structures in the effective display area.

In an embodiment, the bridge-shaped structure groups include at least one sub-bridge-shaped structure group arranged around the effective display area, the sub-bridge-shaped structure group comprises at least two bridge-shaped structures arranged in the transition area, and width values of the bridge-shaped structures in the sub-bridge-shaped structure group are equal.

In an embodiment, the bridge-shaped structure groups include at least one sub-bridge-shaped structure group arranged around the effective display area, the sub-bridge-shaped structure group comprises at least two bridge-shaped structures arranged in the transition area, and width values of the bridge-shaped structures in the sub-bridge-shaped structure group are equal.

In an embodiment, the bridge-shaped structure group comprises at least two sub-bridge-shaped structure groups arranged sequentially around the effective display area, wherein in two adjacent sub-bridge-shaped structure groups, a width value of the bridge-shaped structure in one of the sub-bridge-shaped structure groups is equal to a width value of the bridge-shaped structure in another of the sub-bridge-shaped structure groups.

In an embodiment, a plurality of second island-shaped structures are arranged at intervals in the transition area, any two adjacent second island-shaped structures are connected by the bridge-shaped structure, the first island-shaped structures and the second island-shaped structures are adjacent to each other and connected by the bridge-shaped structures, and the second island-shaped structures and the binding member are connected by the bridge-shaped structures in the transition area.

In an embodiment, the transition area comprises a plurality of transition sub-areas, and the plurality of transition sub-areas sequentially surround the effective display area, and at least two of the second island-shaped structures are provided in each of the transition sub-areas, wherein in any two adjacent transition sub-areas, an arrangement density of the second island-shaped structures in the transition sub-areas close to the effective display area is greater than another arrangement density of the second island-shaped structures in the transition sub-areas away from the effective display area.

In an embodiment, in any two adjacent transition sub-areas, an area of the second island-shaped structures in the transition sub-area close to the effective display area is smaller than another area of the second island-shaped structures in the transition sub-area away from the effective display area.

In an embodiment, distances between any two adjacent second island-shaped structures in one transition sub-area are equal to each other.

In the transition area, from the effective display area to the frame area of the display panel, a width value of the bridge-shaped structure in the transition area gradually increases. As the width value of the bridge-shaped structure increases, an elastic modulus of the display panel in the transition area gradually increases. A tensile strength of the display panel in the transition area gradually increases from the effective display area to the frame area of the display panel. The tensile strength and tensile resistance of the display panel in the transition area are enhanced, and the display panel at the junction of the transition area and the effective display area is prevented from breaking metal traces of the display panel in the transition area due to the local stress caused by the structural mutation. The display effect of the display panel is improved, and the service life of the display panel is effectively extended.

DESCRIPTION OF DRAWINGS

The technical solutions and other beneficial effects of the present application will be made obvious by describing the specific implementation manners of the present application in detail below in conjunction with the accompanying drawings.

DETAILED DESCRIPTION OF PREFERRED EMBODIMENTS

This application provides a display panel and a mobile terminal. In order to make the purpose, technical solutions, and effects of this application clearer and clearer, the following further describes this application in detail with reference to the accompanying drawings and examples. It should be understood that the specific embodiments described here are only used to explain the present application, and are not used to limit the present application.

At present, in an actual production process of stretchable display panels, a stretchable display screen has a sudden change in a design structure at a junction of the stretchable working area and the non-stretchable frame area, which may cause stress concentration at the junction of the working area and the frame area during stretching. Therefore, a disconnection problem in the display panel is induced, which affects a display effect and service life.

This application provides a technical solution that can effectively solve the above-mentioned problems. The technical solution of the present application will now be described in conjunction with specific embodiments, as shown in FIGS. 1-7.

Figure 1:
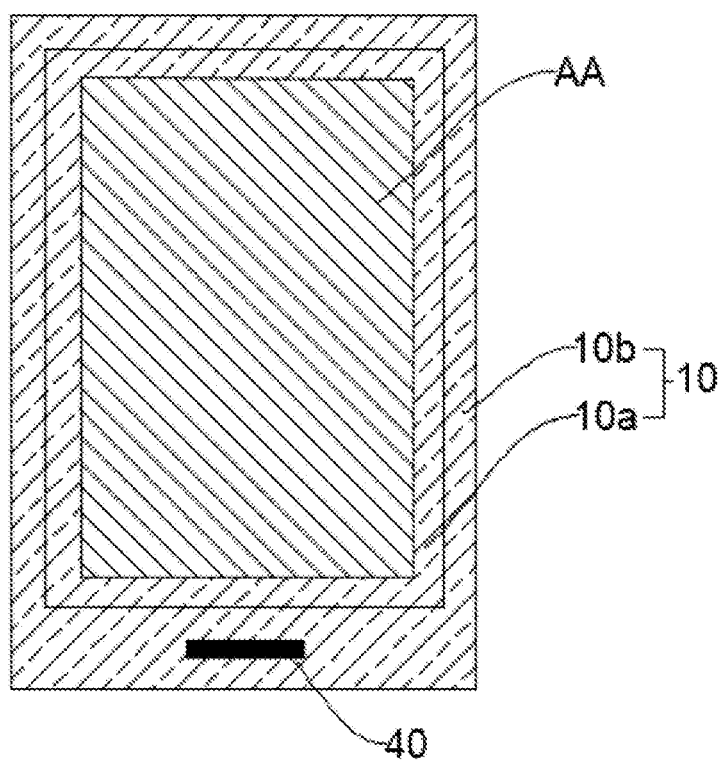
FIG. 1 is a schematic structural diagram of a display panel in an embodiment of the application.
Figure 2:
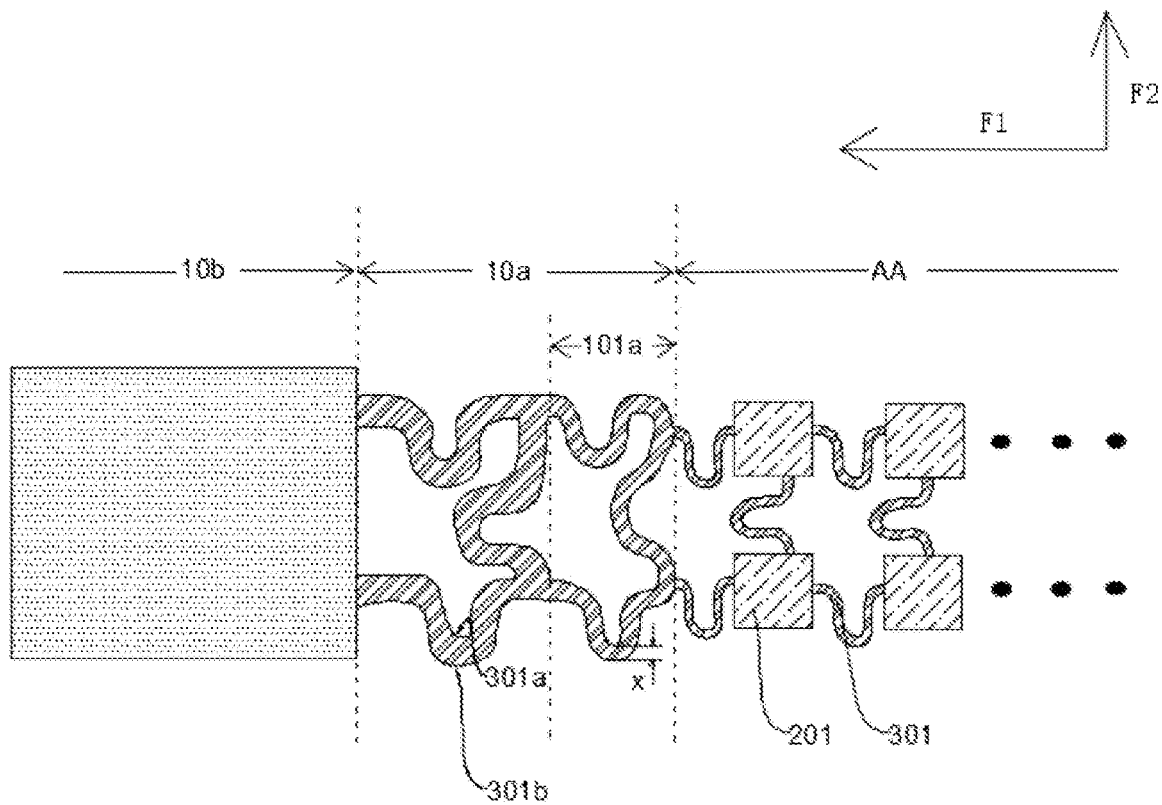
FIG. 2 is a schematic structural diagram of a junction between a non-effective display area and an effective display area of the display panel in an embodiment of the application.

This application provides a display panel, as shown in FIGS. 1-2. The display panel includes an effective display area AA and a non-effective display area 10. The non-effective display area 10 includes a transition area 10a adjacent to the effective display area AA. The display panel also includes:

a plurality of first island-shaped structures 201 arranged in the effective display area AA at intervals, wherein each of the first island-shaped structures 201 is provided with at least one pixel unit;

a binding member arranged in the non-effective display area 10; and a plurality of bridge-shaped structures 301 arranged in the transition area 10a and the effective display area AA, wherein two adjacent first island-shaped structures 201 in the effective display area AA are connected by the bridge-shaped structures 301, wherein the plurality of bridge-shaped structures 301 located in the transition area 10a comprise a plurality of bridge-shaped structure groups, wherein the plurality of the bridge-shaped structure groups are arranged around the effective display area AA in turn, wherein in any two adjacent bridge-shaped structure groups, a distance between any one of the bridge-shaped structures 301 in the bridge-shaped structure groups that is away from the effective display area AA and the effective display area is greater than a distance between any one of the bridge-shaped structures 301 in the bridge-shaped structure groups 101a close to the effective display AA area and the effective display area AA; and one of the bridge-shaped structures 301 in the bridge-shaped structure groups 101a that is away from the effective display area AA has a width value X greater than a width value X of the bridge-shaped structures 301 in the bridge-shaped structure groups 101a close to the effective display area AA, wherein an orthographic projection of the bridge-shaped structures 301 in a direction perpendicular to the display panel comprises a first side 301a and a second side 301b opposite to each other, and a width value X of the bridge-shaped structures 301 is a distance between the first side 301a and the second side 301b of the orthographic projection corresponding to the bridge-shaped structures 301.

Specifically, the non-effective display area 10 may be arranged around the effective display area AA, but the present disclosure is not limited to this.

Specifically, the non-effective display area 10 includes a transition area 10a. The transition area 10a may be arranged around the effective display area AA and adjacent to the effective display area AA. In the first direction F1, a ratio of a width of the transition area 10a to a width of the effective display area AA may be less than 5%. It can be set according to the actual situation, and it is not limited here.

Specifically, the non-effective display area 10 may also include a frame area 10b. The frame areal Ob is close to the transition area 10a away from a side of the effective display area AA. The binding member may be located in the frame area 10b. The binding member is located away from the effective display area AA in the non-effective display area 10. The binding member includes a binding trace and a binding terminal. The binding terminal is used for binding with chip on film (COF)/flexible printed circuit (FPC), so as to achieve a hermetic packaging of the edge of the display panel, wherein the binding trace is used to connect the wiring in the bridge-shaped structures 301 in the transition area.

Specifically, the display panel in the effective display area AA includes a plurality of first island-shaped structures 201 and a bridge-shaped structure 301 connecting two adjacent first island-shaped structures 201. A plurality of first island-shaped structures 201 may be arranged in an array on a flexible substrate. The flexible substrate may be a polyimide film or a double-layer polyimide film with a sandwiched middle layer of silicon nitride/silicon oxide film.

It can be understood that the first island-shaped structure 201 may include a driving device and a display device. The driving device is electrically connected to the display device to drive the display device to display. The driving device may be a thin film transistor. The display device may be an organic electroluminescence display (OLED) display device or a micro light-emitting diode (Micro LED) display device, etc. The display device includes at least one pixel unit to realize normal display functions.

It is understandable that the first island-shaped structure 201 may also include at least one light-emitting element and an electrical element electrically connected to the light-emitting element. The light-emitting element may include various light-emitting elements. For example, an organic light emitting diode including an organic emission layer, a micro light-emitting diode (LED) or a quantum dot LED, etc. The electrical component may include such as at least one transistor and a capacitor, which is connected to the light-emitting component.

Understandably, the bridge-shaped structure 301 includes wiring electrically connected to the driving device and the display device of the first island-shaped structure 201. The bridge-shaped structure 301 includes at least one wiring. When there are multiple wirings, the multiple wirings can be disconnected from each other. The wiring may specifically be one or more of wires having a signal transmission function, such as a driving power line, a common power line, a scan line, or a data line.

Specifically, the bridge-shaped structure 301 includes bending portions that are bent in at least two mutually different directions. For example, the bridge-shaped structure 301 includes a first end and a second end. The first end may be connected to a first island-shaped structure 201. The second end of the bridge-shaped structure 301 is separated from the first island-shaped structure 201 while bending and extending along an extension direction that forms a certain angle with the first end. For example, the bridge-shaped structure 301 may be curvilinear. At the same time, it can also be other line types. Specific shape can be set according to the process requirements, and it has a certain elongation modulus. For example, an actual length of the bridge-shaped structure 301 connecting two adjacent first island-shaped structures 201 in the effective display area AA is greater than a distance between two adjacent first island-shaped structures 201.

Specifically, in the effective display area AA and the transition area 10a, a cross section of the bridge-shaped structure 301 perpendicular to the display panel direction may be circular or rectangular. The material of the bridge-shaped structure 301 may be a metal material, for example, a single layer or multiple layers of titanium/aluminum/titanium alloy, etc.

Specifically, the pixel island-shaped structure may or may not be provided in the transition area 10a, and the function of the pixel island-shaped structure is not limited here. It should be noted that the pixel island-shaped structure here is similar to the first island-shaped structure 201, which includes the first island-shaped structure 201 that can be displayed normally; also includes island-shaped structures that can't be displayed normally, but have a light-up function, and also includes island-shaped structures that can neither display normally nor have the function of illuminating. When the pixel island-shaped structure is the same as the first island-shaped structure 201, the same manufacturing process can be used for manufacturing, which can save production costs. When the pixel island-shaped structure is an island-shaped structure that cannot be displayed normally but has a bright function, that is, when the sub-pixels in the pixel island-shaped structure are virtual pixels, it can ensure that the tensile modulus of the display panel changes smoothly. The display screen will not be affected by the stretching deformation, which will affect the display effect of the screen.

Specifically, in the effective display area AA, the width values X of the bridge-shaped structures 301 may all be equal.

It should be noted that, as shown in FIG. 2, a rectangular stretchable flexible display panel with straight edges is taken as an example, a direction from the effective display area AA to the non-effective display area 10 is the first direction F1, and a direction clockwise along the edge of the effective display area AA and perpendicular to the first direction F1 is the second direction F2.

It can be understood that, as shown in FIG. 2, in the first direction F1, multiple bridge-shaped structure groups 301 are arranged in sequence. In the plurality of bridge-shaped structure groups 101a, a width value X of any one of the bridge-shaped structures 301 in the bridge-shaped structure groups 101a adjacent to the effective display area AA is greater than or equal to a width value X of the bridge-shaped structure 301 in the effective display area AA. In the first direction F1, multiple bridge-shaped structure groups 301 are arranged in sequence. In the plurality of bridge-shaped structure groups 101a, a width value X of the bridge-shaped structures 301 in the bridge-shaped structure groups 101a away from the effective display area AA is greater than a width value X of the bridge-shaped structures 301 in the bridge-shaped structure groups 101a close to the effective display area AA. In this embodiment, by designing the width value X of the bridge-shaped structure 301 of the transition area 10a in a gradual form, an elastic modulus between the structure of the effective display area AA and the structure of the transition area 10a does not change significantly during connection, which effectively alleviate the influence of tensile stress on the circuit and other structures of the non-effective display area 10. In a direction from the effective display area AA to the frame area 10b of the display panel, a width value X of the bridge-shaped structure 301 of the transition area 10a gradually increases. The tensile strength of the display panel in the transition area 10a gradually increases in the direction from the effective display area AA to the non-effective display area 10, such that while ensuring the tensile performance of the effective display area AA, the tensile strength and tensile performance of the display panel in the transition area 10a are effectively enhanced, and so as to prevent the display panel at the junction of the transition area 10a and the effective display area AA from causing local stress due to structural mutations to cause the metal traces in the display panel of the transition area 10a to break. The problem of disconnection in the display panel is solved, the display effect of the display panel is improved, and the service life of the display panel is prolonged.

In one embodiment, in the plurality of bridge-shaped structure groups 101a, a width value X of any one of the bridge-shaped structures 301 in the bridge-shaped structure group 101a adjacent to the effective display area AA is greater than or equal to a width value X of the bridge-shaped structure 301 in the effective display area AA.

It is understandable that, as shown in FIG. 2, by designing the width value X of the bridge-shaped structure 301 in the transition area 10a of the display panel to be greater than or equal to the width value X of the bridge-shaped structure 301 in the effective display area AA, it can further prevent the elastic modulus between the AA structure of the effective display area and the structure of the transition area 10a from changing significantly. It is avoided that the display panel at the junction of the transition area 10a and the effective display area AA generates local stress during stretching, causing the metal traces in the display panel to break, which effectively alleviate the impact of tensile stress on the circuit structure of the display panel, and solve the problem of disconnection in the display panel. The display effect of the display panel is improved, and the service life of the display panel is effectively extended.

Figure 3:
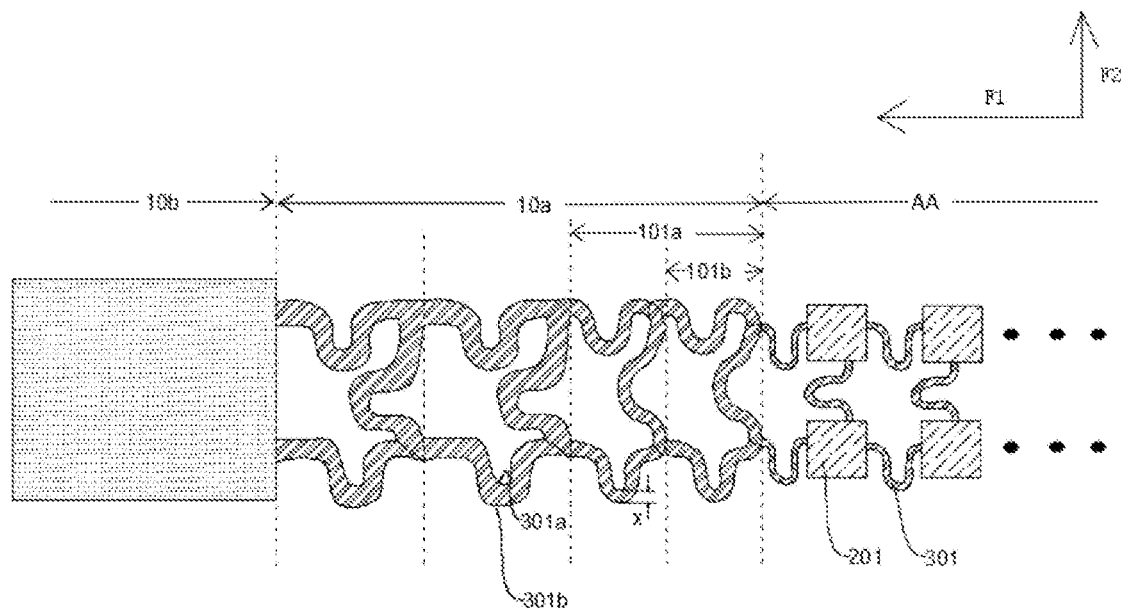
FIG. 3 is a schematic structural diagram of a part of a display panel with a plurality of sub-bridge-shaped structure groups arranged in a transition area in an embodiment of the application.

In one embodiment, as shown in FIG. 3, the bridge-shaped structure groups 101a includes at least one sub-bridge-shaped structure group 101b arranged around the effective display area AA. The sub-bridge-shaped structure group 101b includes at least two bridge-shaped structures 301 arranged in the transition area 10a. Width values X of bridge-shaped structures 301 in the sub-bridge-shaped structure group 101b are equal.

Understandably, the width values X of the bridge-shaped structures 301 of the sub-bridge-shaped structure group 101b are equal, so that the elastic modulus of the same sub-bridge-shaped structure group 101b is more obvious. Since the bridge-shaped structure 301 has a relatively fine structure, the bridge-shaped structure 301 with the same width value X is used to prepare the sub-bridge-shaped structure group 101b. By setting the sub-bridge-shaped structure group 101b with different width values X of the bridge-shaped structure 301, the difficulty of preparing the bridge-shaped structure 301 in the transition area 10a can be effectively reduced, and the production cost can be reduced.

In one embodiment, the bridge-shaped structure group 101a includes at least two sub-bridge-shaped structure groups 101b arranged sequentially around the effective display area AA. In two adjacent sub-bridge-shaped structure groups 101b, the width value X of the bridge-shaped structures 301 in one of the sub-bridge-shaped structure groups 101b is equal to another width value X of the bridge-shaped structure 301 in the sub-bridge-shaped structure group 101b.

Specifically, the bridge-shaped structure group 101a includes at least two sub-bridge-shaped structure groups 101b. Each sub-bridge-shaped structure group 101b may also be arranged to surround the effective display area AA. The width values X of the bridge-shaped structures 301 of the two adjacent sub-bridge-shaped structure groups 101b are equal, which can be understood as the same width value X of the bridge-shaped structure 301 of the two adjacent sub-bridge-shaped structure groups 101b.

Understandably, by setting the width values X of the bridge-shaped structure 301 of two adjacent sub-bridge-shaped structure groups 101b to be equal, the change of the width value X of the bridge-shaped structure 301 between the bridge-shaped structure groups 101a can have a variety of gradual changes. A change rate of the width value X of the bridge-shaped structure 301 can be adjusted according to the actual situation, so as to realize that the bridge-shaped structure 301 of the transition area 10a has a better tensile strength.

Figure 4:
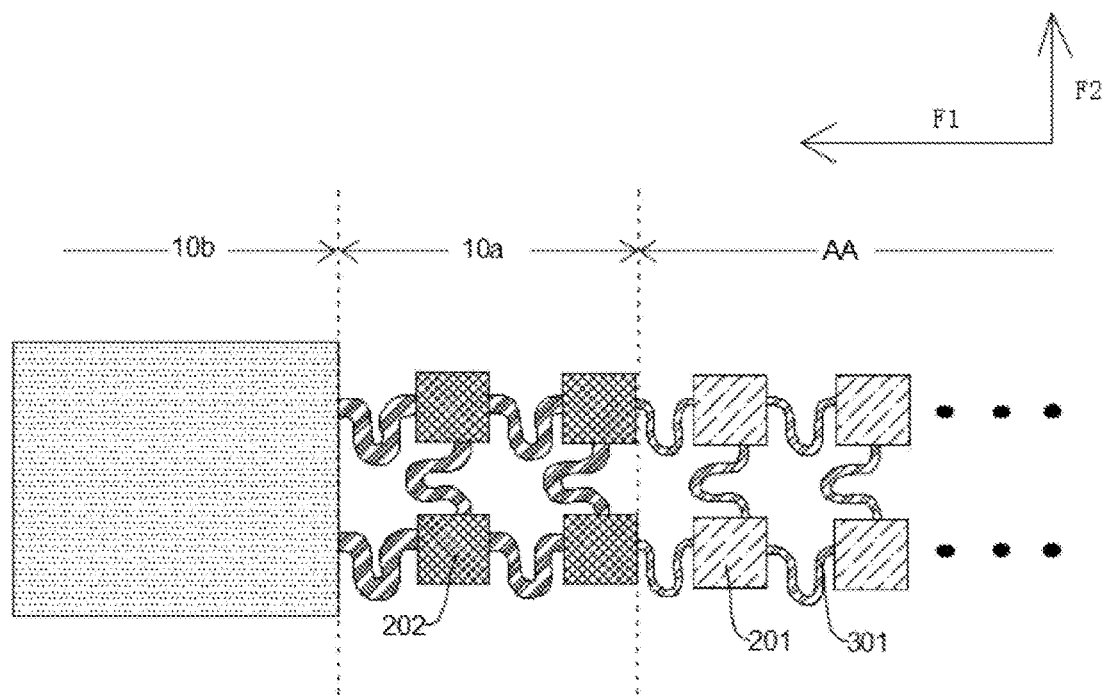
FIG. 4 is a schematic structural diagram of a part of a display panel with a second island-shaped structure in the transition area in an embodiment of the application.

In one embodiment, as shown in FIG. 4, a plurality of second island-shaped structures 202 are arranged at intervals in the transition area Any two adjacent second island-shaped structures 202 are connected by the bridge-shaped structure 301. The adjacent first island-shaped structure 201 and the second island-shaped structure 202 are connected by the bridge-shaped structure 301.

Specifically, the second island-shaped structure 202 is an island-shaped structure that does not have a normal display function but has a light-emitting function. The pixels of the display device on the second island-shaped structure 202 are virtual pixels.

It is understandable that in the transition area 10a, the second island-shaped structure 202 is provided so that the elastic modulus of the display panel in the transition area 10a is not much different from the elastic modulus of the display panel in the effective display area AA, and the transition is gentle. When the display panel is stretched, the trace in the display panel will not be broken due to the structural abrupt change of the transition area 10a, thereby affecting the display effect of the display panel.

In an embodiment, the transition area 10a includes a plurality of transition sub-areas 102a, and the plurality of transition sub-areas 102a sequentially surround the effective display area AA.

At least two second island-shaped structures 202 are provided in each transition sub-area 102a. In any two adjacent transition sub-areas 102a. The arrangement density of the second island-shaped structure 202 in the transition sub-area close to the effective display area AA is greater than another arrangement density of the second island-shaped structure 202 in the transition sub-area away from the effective display area AA.

Specifically, the widths of the plurality of transition sub-areas 102a in the first direction F1 may be equal or unequal, and number of the second island-shaped structures 202 in two adjacent transition sub-areas 102a may be equal or different.

Figure 5:
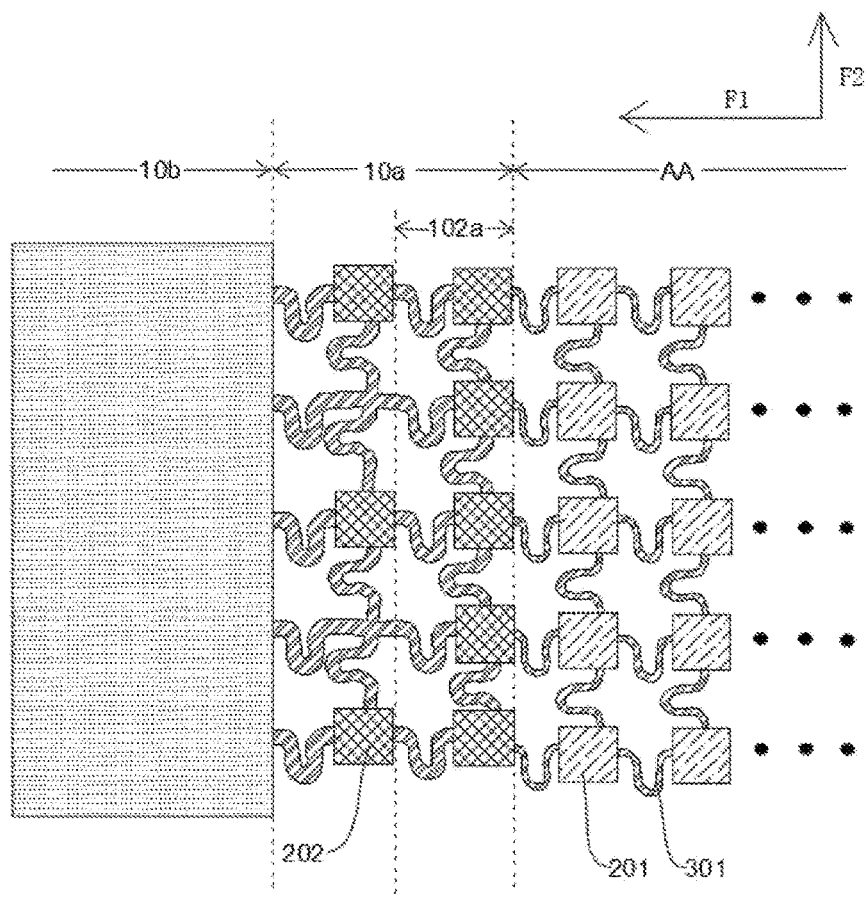
FIG. 5 is a schematic structural diagram of a junction between the transition area of the display panel and the effective display area when the density of the second island-shaped structure in different transition sub-areas is different in an embodiment of the application.

It is understandable that, as shown in FIG. 5, two transition sub-areas 102a are used for description. The number of second island-shaped structures 202 per unit area in a transition sub-area 102a close to the side of the effective display area AA is greater than the number of second island-shaped structures 202 per unit area in another transition sub-area 102a on the side away from the effective display area AA, so as to reduce the stretchability of the display panel of the non-effective display area 10 far away from the effective display area AA. Therefore, the structural stability of the transition sub-area 102a away from the effective display area AA is further improved.

Understandably, in this embodiment, a density of the second island-shaped structure 202 can be set reasonably according to the metal trace structure of the non-effective display area 10, such that the influence of tensile stress on the metal traces of the non-effective display area 10 can be effectively alleviated. Therefore, the tensile reliability of the display panel in the non-effective display area 10 can be further improved.

In one embodiment, in any two adjacent transition sub-areas 102a, an area of the second island-shaped structure 202 in the transition sub-area close to the effective display area AA is smaller than another area of the second island-shaped structure 202 in the wadi area away from the effective display area AA.

Figure 6:
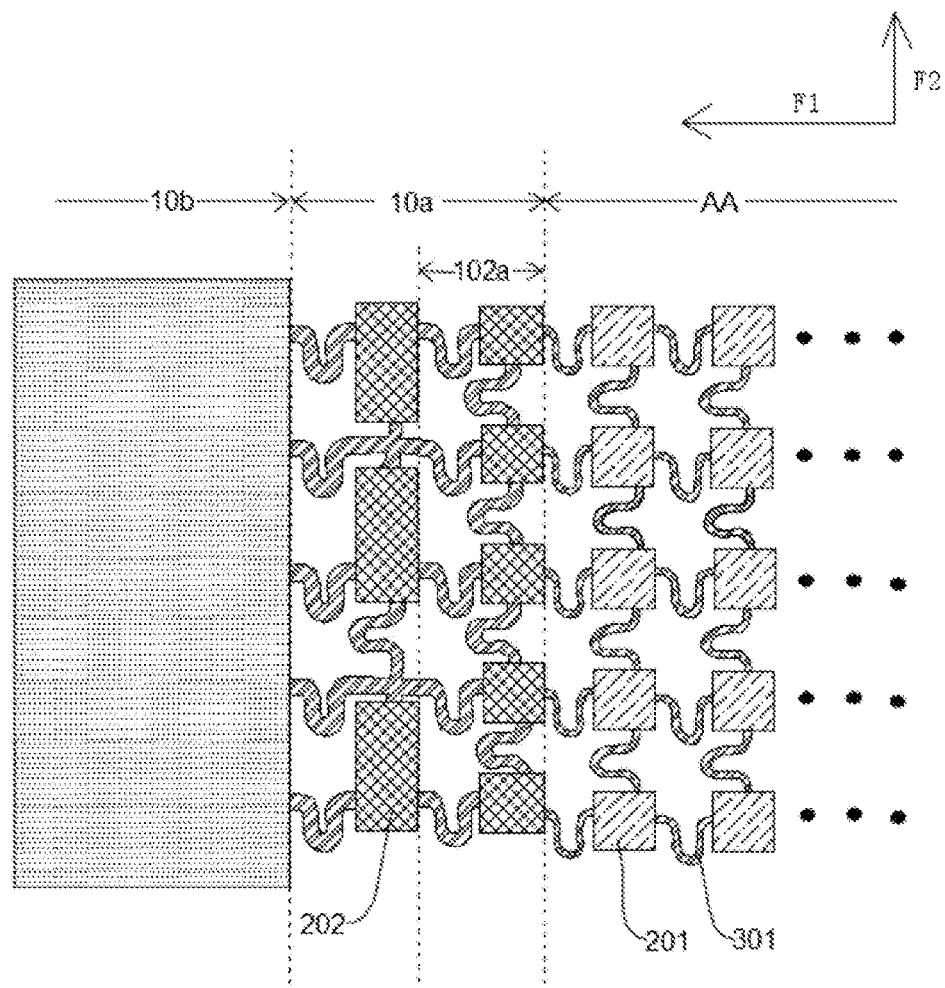
FIG. 6 is a schematic structural diagram of a junction between the transition area of the display panel and the effective display area when the area of the second island-shaped structure in different transition sub-areas is different in an embodiment of the application.

Specifically, as shown in FIG. 6, two transition sub-areas 102a are used for description. The area of the second island-shaped structure 202 in the transition sub-area 102a close to the effective display area AA is smaller than the area of the second island-shaped structure 202 in the transition sub-area 102a far away from the effective display area AA, so as to reduce the stretchability of the display panel far away from the transition sub-area 102a of the effective display area AA. Therefore, the structural stability of the display panel in the transition sub-area 102a far away from the effective display area AA is improved.

It is understandable that the area of the second island-shaped structure 202 can be set reasonably according to the metal trace structure of the non-effective display area 10, such that the influence of tensile stress on the metal traces of the non-effective display area 10 can be effectively alleviated. Therefore, the tensile reliability of the display panel in the non-effective display area 10 can be further improved.

In one embodiment, the distances between any two adjacent second island-shaped structures 202 in one transition sub-area 102a are equal.

It can be understood that the use of the above technical solution makes the tensile strength between the elements in the transition area 10a more even. It is avoided that the structure of the transition area 10a in the second direction F2 is unevenly changed and the tensile strength is different, resulting in a local metal wire breakage in the transition area 10a of the display panel.

In one embodiment, the non-effective display area 10 includes a frame area 10b, and the transition area 10a is located in the frame area 10b and adjacent to the effective display area AA.

Specifically, the frame area 10b also includes binding traces and binding terminals for sealing and binding the edge portion of the display panel.

Specifically, the frame area 10b further includes: a driver chip 40; a control circuit (demux circuit) connected to the drive chip 40; and structures such as binding traces connected to the control circuit. The binding trace connects the data line in the bridge-shaped structure 301 of the effective display area AA and the control circuit in the frame area 10b. The data line is connected to the first island-shaped structure 201. The control circuit is used to control the data signal output by the driving chip 40 to be transmitted to the data line. The driving chip 40 may be arranged in the non-effective display area 10.

Figure 7:
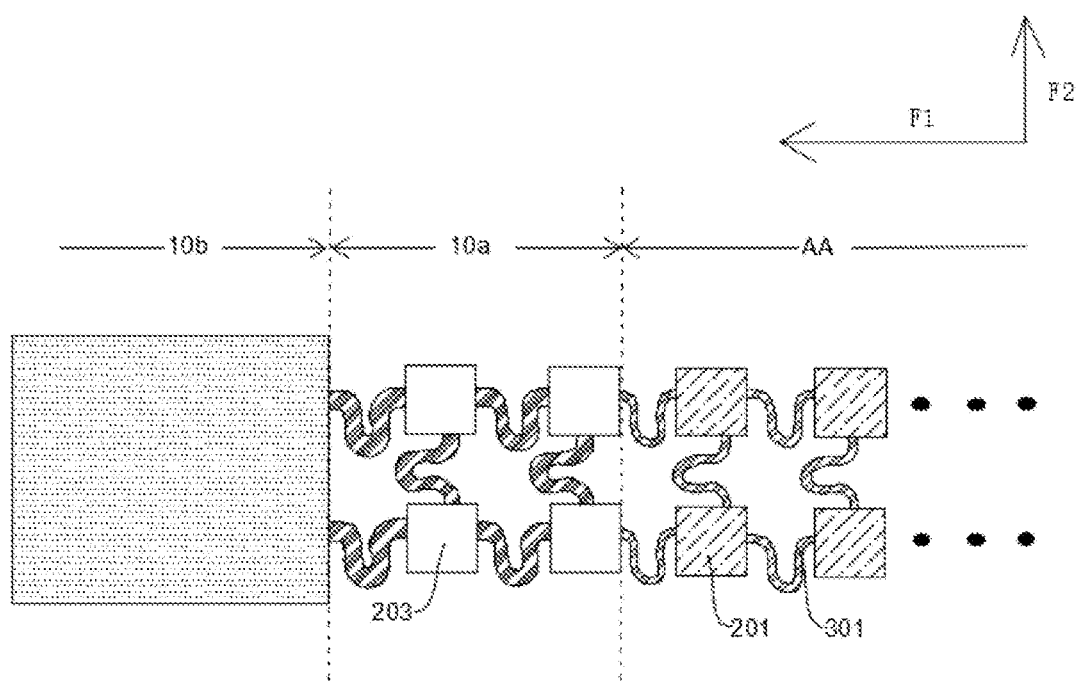
FIG. 7 is a schematic structural diagram of the junction between the non-effective display area and the effective display area with a third island-shaped structure in the transition area in an embodiment of the application.

From above, in this embodiment, as shown in FIG. 7, a plurality of third island-shaped structures 203 are arranged at intervals in the transition area 10a. Any two adjacent third island-shaped structures 203 are connected by the bridge-shaped structure 301. The adjacent first island-shaped structure 201 and third island-shaped structure 203 are connected by the bridge-shaped structure 301.

Specifically, the third island-shaped structure 203 may be an element that only has an island-shaped structure but does not have a display function or a light-emitting function, which has the effect of adjusting the elastic modulus of the transition area 10a.

In one embodiment, two adjacent bridge-shaped structures 301 in the transition area 10a are connected to each other. In the plurality of bridge-shaped structure groups 101a, at least one bridge-shaped structure 301 in the bridge-shaped structure group 101a adjacent to the effective display area AA is connected to the first island-shaped structure 201 or the bridge-shaped structure 301 located in the effective display area AA.

Specifically, in this embodiment, the bridge-shaped structure 301 of the transition area 10a can be understood as a combination of a control circuit and a binding trace.

The present application also provides a mobile terminal, including the display panel and terminal body as described in any one of the foregoing embodiments, and the terminal body and the display panel are combined into one body.

From above, by designing the width value X of the bridge-shaped structure 301 in the transition area 10a of the display panel to be greater than or equal to the width value X of the bridge-shaped structure 301 in the effective display area AA, such that the elastic modulus between the effective display area AA structure and the transition area 10a structure does not change significantly. It is avoided that the display panel at the junction of the transition area 10a and the effective display area AA generates local stress during stretching, causing the metal traces in the display panel to break, which effectively alleviate the impact of tensile stress on the circuit structure of the display panel, and solve the problem of disconnection in the display panel. The display effect of the display panel is improved, and the service life of the display panel is effectively extended. Secondly, in the transition area 10a, in the direction from the effective display area AA to the frame area 10b of the display panel, a width value X of the bridge-shaped structure 301 of the transition area 10a gradually increases. The tensile strength of the display panel in the transition area 10a gradually increases in the direction from the effective display area AA to the display panel frame area 10b. As a result, while ensuring the stretchability of the effective display area AA, the tensile strength and tensile strength of the display panel in the transition area 10a are effectively enhanced, and the service life of the display panel is prolonged.

In the above-mentioned embodiments, the description of each embodiment has its own emphasis. For parts that are not described in detail in an embodiment, reference may be made to related descriptions of other embodiments.

The embodiments of the application are described in detail above. Specific examples are used in this article to describe the principles and implementation of the application, and the description of the above examples is only used to help understand the technical solutions and core ideas of the application. Those of ordinary skill in the art should understand that: they can still modify the technical solutions described in the foregoing embodiments, or equivalently replace some of the technical features. However, these modifications or replacements do not cause the essence of the corresponding technical solutions to deviate from the scope of the technical solutions of the embodiments of the present application.

The invention claimed is:

1. A display panel, comprising an effective display area and a non-effective display area, wherein the non-effective display area includes a transition area adjacent to the effective display area, wherein the display panel further comprises:
 a plurality of first island-shaped structures arranged in the effective display area at intervals, wherein each of the first island-shaped structures is provided with at least one pixel unit;
 a binding member arranged in the non-effective display area; and
 a plurality of bridge-shaped structures arranged in the transition area and the effective display area, wherein two adjacent first island-shaped structures in the effective display area are connected by the bridge-shaped structures located in the effective display area, and the first island-shaped structures and the binding member are connected by the bridge-shaped structures located in the transition area,
 wherein the plurality of bridge-shaped structures located in the transition area comprise a plurality of bridge-shaped structure groups, wherein the plurality of the bridge-shaped structure groups are arranged around the effective display area in turn, wherein in any two adjacent bridge-shaped structure groups, a distance between any one of the bridge-shaped structures in the bridge-shaped structure groups that is away from the effective display area and the effective display area is greater than a distance between any one of the bridge-shaped structures in the bridge-shaped structure groups close to the effective display area and the effective display area; and
 wherein in the plurality of bridge-shaped structure groups, one of the bridge-shaped structures in the bridge-shaped structure groups that is away from the effective display area has a width value greater than a width value of the bridge-shaped structures in the bridge-shaped structure groups close to the effective display area, wherein an orthographic projection of the bridge-shaped structures in a direction perpendicular to the display panel comprises a first side and a second side opposite to each other, and a width value of the bridge-shaped structures is a distance between the first side and the second side of the orthographic projection corresponding to the bridge-shaped structures;
 wherein in two adjacent bridge-shaped structure groups, the bridge-shaped structures in one of the bridge-shaped structure groups and away from the effective display area is directly connected with the bridge-shaped structures in another of the bridge-shaped structure groups and adjacent to the effective display area.

2. The display panel according to claim 1, wherein in the plurality of bridge-shaped structure groups, a width value of any one of the bridge-shaped structures in the bridge-shaped structure groups adjacent to the effective display area is greater than or equal to a width value of the bridge-shaped structures in the effective display area.

3. The display panel according to claim 1, wherein the bridge-shaped structure groups include at least one sub-bridge-shaped structure group arranged around the effective display area, the sub-bridge-shaped structure group comprises at least two bridge-shaped structures arranged in the transition area, and width values of the bridge-shaped structures in the sub-bridge-shaped structure group are equal.

4. The display panel according to claim 3, wherein the bridge-shaped structure group comprises at least two sub-bridge-shaped structure groups arranged sequentially around the effective display area, wherein in two adjacent sub-bridge-shaped structure groups, a width value of the bridge-shaped structure in one of the sub-bridge-shaped structure groups is equal to a width value of the bridge-shaped structure in another of the sub-bridge-shaped structure groups.

5. The display panel according to claim 1, wherein a plurality of second island-shaped structures are arranged at intervals in the transition area, any two adjacent second island-shaped structures are connected by the bridge-shaped structure, the first island-shaped structures and the second island-shaped structures are adjacent to each other and connected by the bridge-shaped structures, and the second island-shaped structures and the binding member are connected by the bridge-shaped structures in the transition area.

6. The display panel according to claim 5, wherein the transition area comprises a plurality of transition sub-areas, and the plurality of transition sub-areas sequentially surround the effective display area, and at least two of the second island-shaped structures are provided in each of the transition sub-areas, wherein in any two adjacent transition sub-areas, an arrangement density of the second island-shaped structures in the transition sub-areas close to the effective display area is greater than another arrangement density of the second island-shaped structures in the transition sub-areas away from the effective display area.

7. The display panel according to claim 6, wherein in any two adjacent transition sub-areas, an area of the second island-shaped structures in the transition sub-area close to the effective display area is smaller than another area of the second island-shaped structures in the transition sub-area away from the effective display area.

8. The display panel according to claim 6, wherein distances between any two adjacent second island-shaped structures in one transition sub-area are equal to each other.

9. The display panel according to claim 1, wherein the non-effective display area comprises a frame area, and the transition area is located in the frame area and adjacent to the effective display area.

10. The display panel according to claim 9, wherein a plurality of third island-shaped structures are arranged at intervals in the transition area, any two adjacent third island-shaped structures are connected by the bridge-shaped structures, the first island-shaped structures and the third island-shaped structures are adjacent to each other and connected by the bridge-shaped structures, and the third island-shaped structures and the binding member are connected by the bridge-shaped structures in the transition area.

11. The display panel according to claim 9, wherein two adjacent bridge-shaped structures in the transition area are connected to each other, wherein in the plurality of bridge-shaped structure groups, at least one bridge-shaped structure in the bridge-shaped structure groups adjacent to the effective display area is connected to the first island-shaped structures or the bridge-shaped structures located in the effective display area.

12. A mobile terminal, comprising a display panel and a terminal body, wherein the terminal body and the display panel are combined into one body, the display panel comprises an effective display area and a non-effective display area, and the non-effective display area comprises a transition area adjacent to the effective display area, wherein the display panel further comprises:
 a plurality of first island-shaped structures arranged in the effective display area at intervals, wherein each of the first island-shaped structures is provided with at least one pixel unit;
 a binding member arranged in the non-effective display area; and a plurality of bridge-shaped structures arranged in the transition area and the effective display area, wherein two adjacent first island-shaped structures in the effective display area are connected by the bridge-shaped structures located in the effective display area, and the first island-shaped structures and the binding member are connected by the bridge-shaped structures located in the transition area, wherein the plurality of bridge-shaped structures located in the transition area comprise a plurality of bridge-shaped structure groups, wherein the plurality of the bridge-shaped structure groups are arranged around the effective display area in turn, wherein in any two adjacent bridge-shaped structure groups, a distance between any one of the bridge-shaped structures in the bridge-shaped structure groups that is away from the effective display area and the effective display area is greater than a distance between any one of the bridge-shaped structures in the bridge-shaped structure groups close to the effective display area and the effective display area; and wherein in the plurality of bridge-shaped structure groups, one of the bridge-shaped structures in the bridge-shaped structure groups that is away from the effective display area has a width value greater than a width value of the bridge-shaped structures in the bridge-shaped structure groups close to the effective display area, wherein an orthographic projection of the bridge-shaped structures in a direction perpendicular to the display panel comprises a first side and a second side opposite to each other, and a width value of the bridge-shaped structures is a distance between the first side and the second side of the orthographic projection corresponding to the bridge-shaped structures;

wherein in two adjacent bridge-shaped structure groups, the bridge-shaped structures in one of the bridge-shaped structure groups and away from the effective display area is directly connected with the bridge-shaped structures in another of the bridge-shaped structure groups and adjacent to the effective display area.

13. The mobile terminal according to claim 12, wherein in the plurality of bridge-shaped structure groups, a width value of any one of the bridge-shaped structures in the bridge-shaped structure groups adjacent to the effective display area is greater than or equal to a width value of the bridge-shaped structures in the effective display area.

14. The mobile terminal according to claim 12, wherein the bridge-shaped structure groups include at least one sub-bridge-shaped structure group arranged around the effective display area, the sub-bridge-shaped structure group comprises at least two bridge-shaped structures arranged in the transition area, and width values of the bridge-shaped structures in the sub-bridge-shaped structure group are equal.

15. The mobile terminal according to claim 14, wherein the bridge-shaped structure group comprises at least two sub-bridge-shaped structure groups arranged sequentially around the effective display area, wherein in two adjacent sub-bridge-shaped structure groups, a width value of the bridge-shaped structure in one of the sub-bridge-shaped structure groups is equal to a width value of the bridge-shaped structure in another of the sub-bridge-shaped structure groups.

16. The mobile terminal according to claim 12, wherein a plurality of second island-shaped structures are arranged at intervals in the transition area, any two adjacent second island-shaped structures are connected by the bridge-shaped structure, the first island-shaped structures and the second island-shaped structures are adjacent to each other and connected by the bridge-shaped structures, and the second island-shaped structures and the binding member are connected by the bridge-shaped structures in the transition area.

17. The mobile terminal according to claim 16, wherein the transition area comprises a plurality of transition sub-areas, and the plurality of transition sub-areas sequentially surround the effective display area, and at least two of the second island-shaped structures are provided in each of the transition sub-areas, wherein in any two adjacent transition sub-areas, an arrangement density of the second island-shaped structures in the transition sub-areas close to the effective display area is greater than another arrangement density of the second island-shaped structures in the transition sub-areas away from the effective display area.

18. The mobile terminal according to claim 17, wherein in any two adjacent transition sub-areas, an area of the second island-shaped structures in the transition sub-area close to the effective display area is smaller than another area of the second island-shaped structures in the transition sub-area away from the effective display area.

19. The mobile terminal according to claim 17, wherein distances between any two adjacent second island-shaped structures in one transition sub-area are equal to each other.

* * * * *